(12) United States Patent
Ueda et al.

(10) Patent No.: US 10,119,565 B2
(45) Date of Patent: Nov. 6, 2018

(54) AIR BEARING

(71) Applicant: Mitutoyo Corporation, Kawasaki, Kanagawa (JP)

(72) Inventors: Kenji Ueda, Kanagawa (JP); Hisayoshi Sakai, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 15/464,552

(22) Filed: Mar. 21, 2017

(65) Prior Publication Data

US 2017/0284462 A1    Oct. 5, 2017

(30) Foreign Application Priority Data

Apr. 1, 2016   (JP) ................... 2016-074065

(51) Int. Cl.
*F16C 29/02*    (2006.01)
*F16C 32/06*    (2006.01)
(Continued)

(52) U.S. Cl.
CPC ........ *F16C 29/025* (2013.01); *F16C 32/0622* (2013.01); *F16C 32/0625* (2013.01);
(Continued)

(58) Field of Classification Search
CPC .. F16C 32/06; F16C 32/0603; F16C 32/0607; F16C 32/0614; F16C 32/0622;
(Continued)

(56) References Cited

U.S. PATENT DOCUMENTS 3,635,532 A * 1/1972 Zerbola .................... B23Q 1/38
                                                    184/5
3,640,590 A * 2/1972 Beisemann ........... F16C 29/025
                                                    384/113
(Continued)

FOREIGN PATENT DOCUMENTS

JP    61-103011    5/1986
JP    06-56234     3/1994
(Continued)

OTHER PUBLICATIONS

Japanese Office Action with English Translation dated Sep. 19, 2017, 11 pages.
(Continued)

*Primary Examiner* — Alan B Waits
(74) *Attorney, Agent, or Firm* — Rankin, Hill & Clark LLP

(57) ABSTRACT

The air bearing includes a main body part having a bearing surface opposed to a guide face, first and second flow path parts, which are provided in the main body part, for allowing compressed air supplied from outside to flow, an air supply hole, which is provided in the flow path part, for supplying compressed air to the guide face to form an air film between the bearing surface and the guide face, and a negative pressure generating part, which is provided in the second flow path part intersecting with the first flow path part, for generating a negative pressure for sucking air between the guide face and the main body part by increasing the flow velocity of the compressed air.

20 Claims, 15 Drawing Sheets

(51) Int. Cl.
*G01B 5/00* (2006.01)
*G01B 21/04* (2006.01)

(52) U.S. Cl.
CPC ........ *G01B 5/0009* (2013.01); *F16C 2240/44* (2013.01); *F16C 2370/00* (2013.01); *G01B 21/047* (2013.01)

(58) Field of Classification Search
CPC .............. F16C 32/0625; F16C 32/0662; F16C 32/0666; F16C 32/0674; F16C 29/025; F16C 2370/00
See application file for complete search history.

(56) References Cited

U.S. PATENT DOCUMENTS

| | | | | |
|---|---|---|---|---|
| 3,781,070 | A * | 12/1973 | Uhtenwoldt | F16C 29/025 384/12 |
| 4,245,844 | A * | 1/1981 | Pohl | F16C 32/06 277/432 |
| 4,465,325 | A * | 8/1984 | Faure | F16C 29/025 376/252 |
| 5,104,237 | A * | 4/1992 | Slocum | F16C 29/025 29/898.02 |
| 6,443,618 | B1 * | 9/2002 | Nishikawa | F16C 29/025 277/351 |
| 6,515,288 | B1 * | 2/2003 | Ryding | F16C 29/025 250/441.11 |
| 7,290,931 | B2 * | 11/2007 | Wardman | F16C 29/025 384/12 |
| 2002/0118897 | A1 * | 8/2002 | Sakino | F16C 29/025 384/12 |
| 2004/0057639 | A1 * | 3/2004 | Roeders | B23Q 1/385 384/12 |
| 2004/0246455 | A1 * | 12/2004 | Emoto | F16C 29/025 355/53 |
| 2005/0180666 | A1 * | 8/2005 | Ahn | F16C 29/025 384/12 |
| 2007/0014494 | A1 * | 1/2007 | Wardman | F16C 29/025 384/12 |
| 2008/0304772 | A1 * | 12/2008 | Kakutani | F16C 29/025 384/12 |
| 2014/0016886 | A1 * | 1/2014 | Li | F16C 29/025 384/12 |

FOREIGN PATENT DOCUMENTS

| | | |
|---|---|---|
| JP | 06-126129 | 5/1994 |
| JP | 07-317767 | 12/1995 |
| JP | 10-331852 | 12/1998 |
| JP | 2002-066854 | 3/2002 |
| JP | 2005-037201 | 2/2005 |
| JP | 2005-083789 | 3/2005 |
| JP | 2005-282635 | 10/2005 |
| JP | 2007-024314 | 2/2007 |
| JP | 2008-151656 | 7/2008 |
| JP | 2010-249315 | 11/2010 |
| WO | 2009-051192 A1 | 4/2009 |

OTHER PUBLICATIONS

Japanese Office Action dated Mar. 13, 2018 with English Translation, 13 pages.

* cited by examiner

I-I cross-sectional view

II-II cross-sectional view

AIR BEARING

CROSS-REFERENCE TO RELATED APPLICATIONS

The present application claims priority to Japanese Patent Application number 2016-074065, filed on Apr. 1, 2016. The content of this application is incorporated herein by reference in its entirety.

BACKGROUND OF THE INVENTION

The present invention relates to an air bearing with a vacuum preloading function.

Conventionally, many air bearings are used for high-precision measuring equipment such as a coordinate measuring machine and a guiding mechanism of a high-precision machine tool. When compressed air provided from an exterior compressor to an air bearing is supplied to a guide face of a guiding mechanism, an air film is generated between a bearing surface and the guide face of the air bearing. Accordingly, the bearing surface floats from the guide face, and so a guiding mechanism with substantially zero-sliding resistance can be realized.

It is known that the air film has a characteristic that its stiffness varies non-linearly in accordance with a load applied on the air bearing, and the stiffness of the air film is low and unstable in a light-load state. Accordingly, in order to secure the stiffness of the air film between the bearing surface and the guide surface, a technique for controlling the thickness of the air film to be constant is adopted using the vacuum preload method by the suction force due to a negative pressure as shown in, for example, Japanese Unexamined Patent Application Publication No. 2005-037201.

However, piping for connecting the air bearing and the compressor to supply the compressed air and piping for connecting the air bearing and the vacuum pump to obtain the negative pressure are separately required for the vacuum preloading method of Japanese Unexamined Patent Application Publication No. 2005-037201. For this reason, the entire apparatus including the air bearing becomes large and complicated.

BRIEF SUMMARY OF THE INVENTION

This invention focuses on these points, and an object of the invention is to provide an air bearing having a vacuum preloading function with a simple configuration.

In one aspect of the present invention, an air bearing comprises a main body part that includes a bearing part opposed to a guide face, a first flow path part and a second flow path part to which compressed air supplied from outside flows after being branched by a branch part, the first flow path part being provided in the main body part, an air supply hole for supplying compressed air to the guide face to form an air film between the bearing surface and the guide face, the air supply hole being provided in the first flow path part, and a negative pressure generating part for generating a negative pressure for sucking air between the guide face and the main body part by increasing flow velocity of the compressed air, the negative pressure generating part being provided in the second flow path part is provided.

DETAILED DESCRIPTION OF THE INVENTION

<Outline of the Air Bearing>

Figure 1:
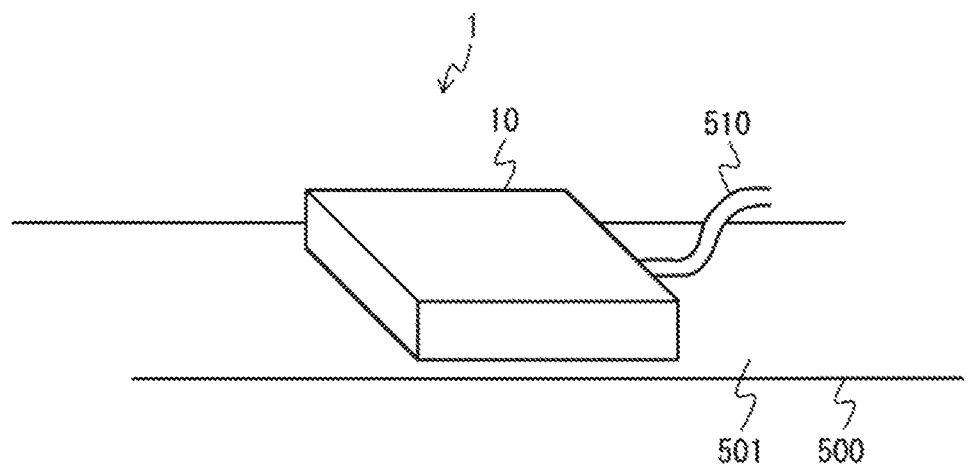
FIG. 1 shows a schematic view for explaining an external configuration of an air bearing 1 according to one exemplary embodiment of the present invention.
Figure 2:
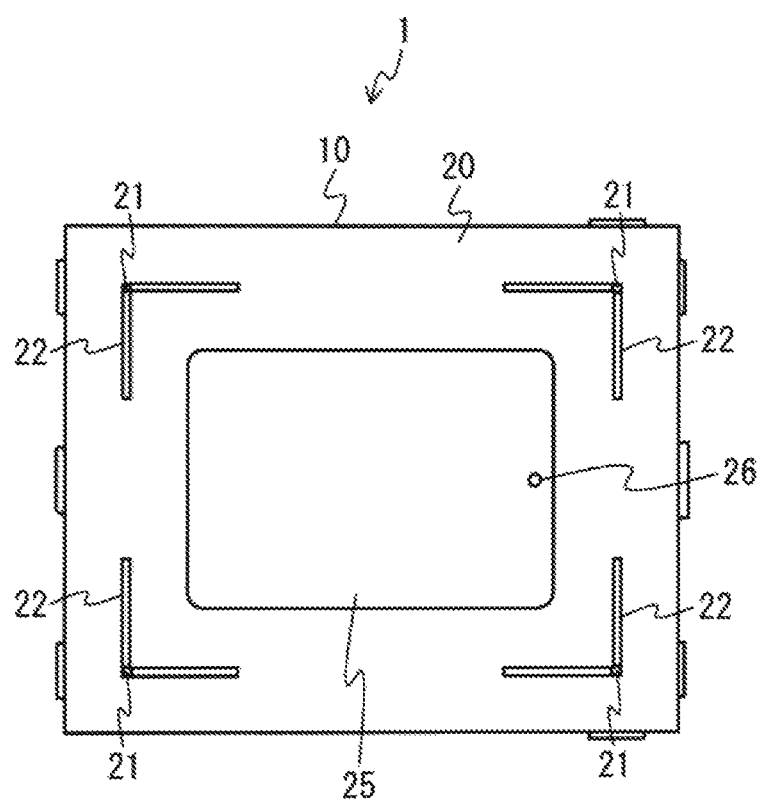
FIG. 2 shows a bearing surface 20 side of the air bearing 1.

An external configuration of an air bearing 1 according to one exemplary embodiment is explained with reference to FIG. 1 and FIG. 2. FIG. 1 shows a schematic view for explaining an external configuration of an air bearing 1 according to one exemplary embodiment. FIG. 2 shows a bearing surface 20 side of the air bearing 1.

The air bearing 1 is used for a guiding mechanism of a high-precision measuring equipment such as a coordinate measuring machine. Here, the air bearing 1 is mounted on a guide rail 500 of the guiding mechanism as shown in FIG. 1. The air bearing 1 is a non-contact type bearing in which an air film is interposed between a guide face 501 of the guide rail 500 and the bearing surface 20 (FIG. 2). Here, a surface plate made of stone is used as the guide face 501, but it is not so limited and the guide face 501 may be made of other materials as long as it is a plate-shaped member that has the flatness required for using the air bearing 1. For example, the guide face 501 may be made of iron, aluminum, stainless steel, glass, and acrylic.

The air bearing 1 includes a main body part 10 having a rectangular parallelepiped shape. The main body part 10 is made of, for example, metal and is connected to a compressor that supplies compressed air with a sufficient flow rate (for example, 0.5 MPa or more, 15 L/min or more) through a supply path 510. Inside the main body part 10, a flow path part (described later) through which the supplied compressed air flows is provided. Further, as shown in FIG. 2, an air supply hole 21, a groove part 22, a recessed part 25, and a suction hole 26 are provided on a bearing surface 20 of the main body part 10.

The bearing surface 20 faces the guide face 501 (FIG. 1) of the guide rail 500. When compressed air is supplied to the air bearing 1, an air film formed of compressed air is interposed between the bearing surface 20 and the guide face 501.

The air supply hole 21 is a through-hole providing communication between the bearing surface 20 and the flow path part in the main body part 10, and supplies compressed air toward the guide face 501. As a result, an air film of compressed air is formed between the bearing surface 20 and the guide face 501 (air supply region). The air supply hole 21 is a small hole having a diameter of, for example, about 0.2 (mm) and is provided at the four corners of the bearing surface 20 of the main body part 10.

The groove part 22 is provided in an L shape at the four corners of the bearing surface 20 of the main body part 10 so as to communicate with the air supply hole 21. The four groove parts 22 are separated from each other, but they are not so limited and they may be connected. The compressed air supplied by the air supply hole 21 flows along the groove part 22, and so an air film is formed between the bearing surface 20 and the guide face 501. Although an air film can be formed without the groove part 22, the groove part 22 is effective for stably forming an air film having a uniform thickness over a wider area.

The recessed part 25 is a recessed region formed in the bearing surface 20. The recessed part 25 is recessed by a predetermined depth from the bearing surface 20. The recessed part 25 is formed in a rectangular shape in the center region of the bearing surface 20.

The suction hole 26 is a through-hole providing communication between the recessed part 25 and the flow path part in the main body part 10, and sucks the air in the recessed part 25 (the air between the main body part 10 and the guide face 501 (suction region)). The suction hole 26, whose details will be described later, sucks the air in the recessed part 25 using the negative pressure generated by the negative pressure generating part provided in the flow path part in the main body part 10. As a result, the suction force (preload) can be generated in the recessed part 25. This suction force is proportional to the area of the recessed part 25. Here, since about 0.8 (kgf) is generated per 1 (cm²), when the area of the recessed part 25 is, for example, 50 (cm²), a suction force of about 40 (kgf) can be generated.

Here, the stiffness of the air film formed between the bearing surface 20 and the guide face 501 by the compressed air is explained. The stiffness of the air film is defined by using the load and the film thickness as shown in the following equation (1).

$$k = \frac{\Delta W}{\Delta h} \quad (1)$$

The stiffness of the air film is indicated by k in equation (1), a variation in the load working on the air bearing 1 is indicated by $\Delta W$, and a variation in the film thickness of the air film is indicated by $\Delta h$. Further, because $\Delta W = \Delta p \times A$ when assuming that the change in air pressure after passing through the air supply hole 21 is $\Delta p$ and the bearing effective area is A, the above equation (1) can be replaced by the following equation (2).

$$k = A \times \frac{\Delta p}{\Delta h} \quad (2)$$

Figure 3:
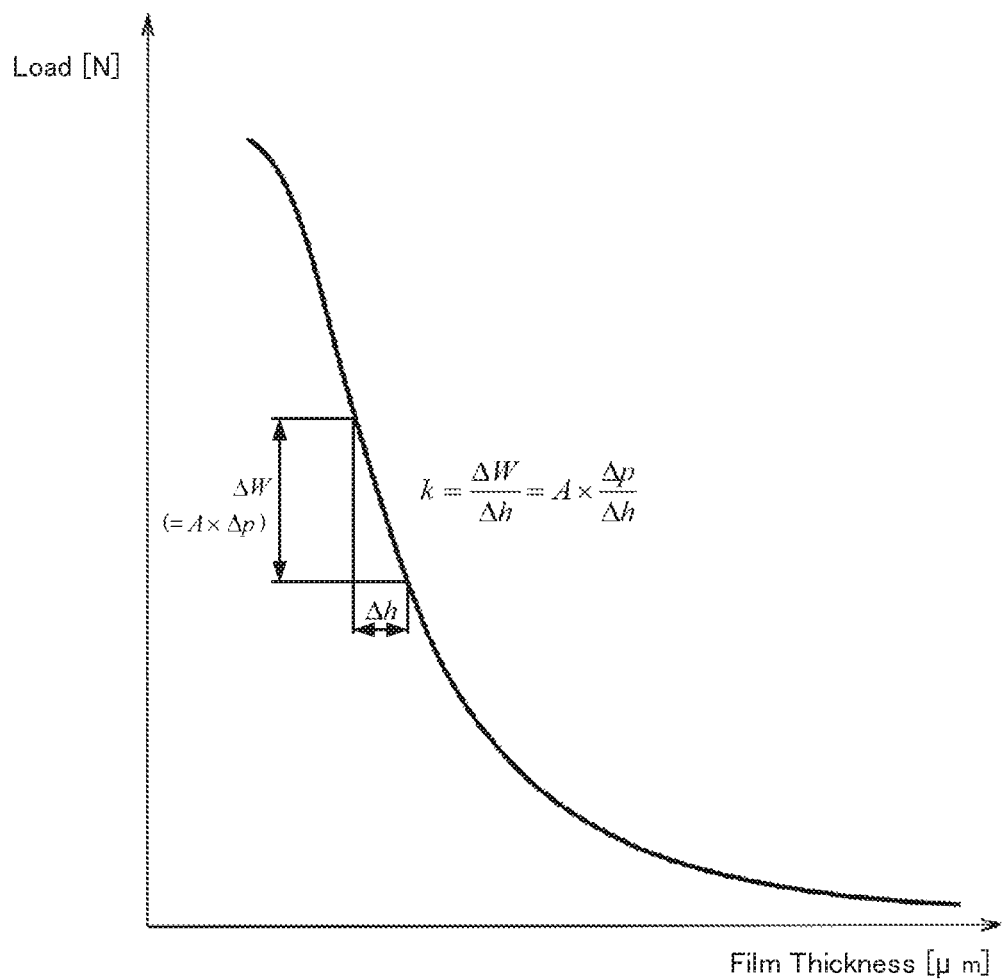
FIG. 3 shows a diagram indicating a relationship between a thickness of an air film and a load.

FIG. 3 shows a diagram indicating the relationship between the film thickness of the air film and the load. The horizontal axis of the graph shows the film thickness [μm] of the air film and the vertical axis shows the load [N]. The stiffness k defined by the above equation (1) corresponds to the slope of the nonlinear curve shown in FIG. 3. As can be seen from FIG. 3, when the film thickness is small, the inclination is steep at the approximately linear part in this characteristic curve, and the stiffness of the air film is high. Therefore, even when the load fluctuates in a state where the film thickness is small, the fluctuation of the film thickness is small and the air film is maintained in a stable state. On the other hand, when the film thickness is large, the slope of the curve is gentle (that is, the stiffness of the air film is low). For this reason, when the load fluctuates in a state where the film thickness is large, the fluctuation of the film thickness also increases and the air film becomes unstable. Further, it is also understood from the above equation (2) that an increase of $\Delta p$ also contributes to an increase of the stiffness k. That is, in order to increase $\Delta p$, it is sufficient to increase the change in the air flow velocity passing through the air supply hole 21, and it is understood that the diameter of the air supply hole 21 should be made smaller for this purpose. Therefore, by making the diameter of the air supply hole 21 smaller, the film thickness of the air film becomes smaller and the stiffness is further enhanced. Furthermore, the amount of air flowing from the air film into the negative pressure region of the recessed part 25 is reduced as the film thickness becomes smaller, and so the suction force generated by the negative pressure is prevented from deteriorating and a higher suction force is maintained.

As described above, in order to maintain the stiffness of the air film at a high level and to use the air film in a stable state, it is desirable to use it within the range of the load corresponding to the approximately linear part in the characteristic curve. Therefore, in the air bearing 1 according to the present exemplary embodiment, even in the case where the load supported by the air bearing 1 is small, a load for attracting the main body part 10 toward the guide face 501 side is given by sucking the air in the recessed part 25 of the main body part 10 using the negative pressure generated in the negative pressure generating part inside the main body part 10. This makes it possible to use the air film in the load range corresponding to the approximately linear part in the characteristic curve, and it is possible to increase the stiffness of the air film.

<Internal Configuration of the Air Bearing>

Figure 4:
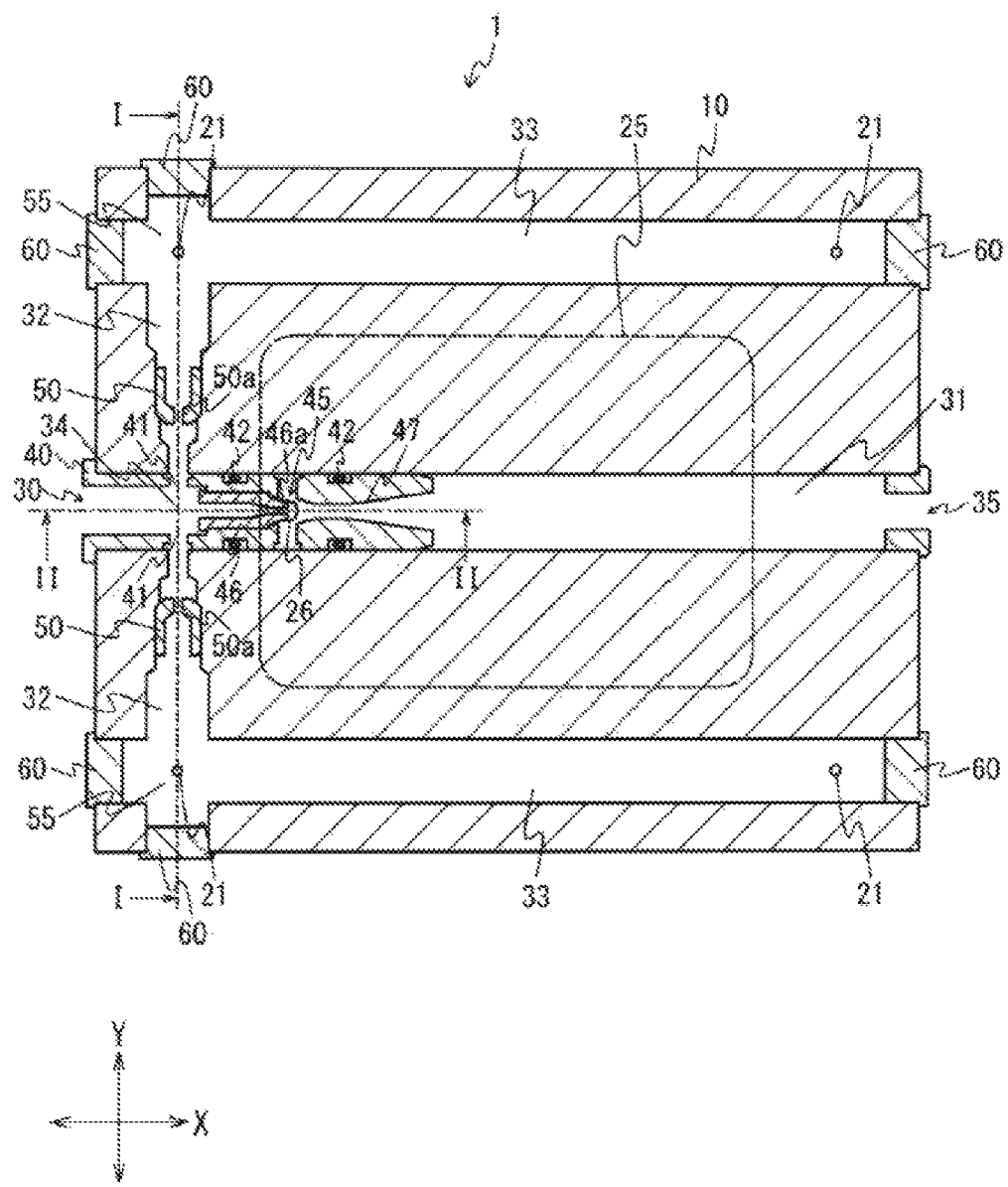
FIG. 4 shows an internal configuration of the air bearing 1.
Figure 5:
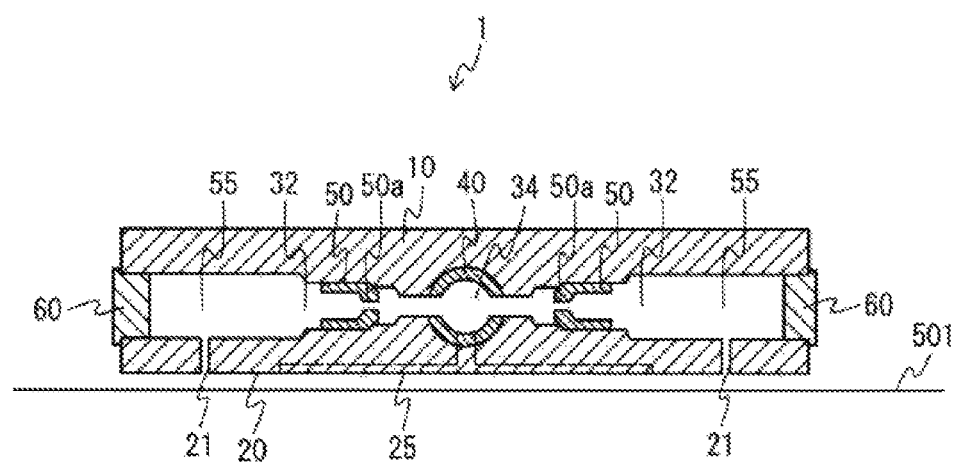
FIG. 5 shows a I-I cross-sectional view of FIG. 4.
Figure 6:
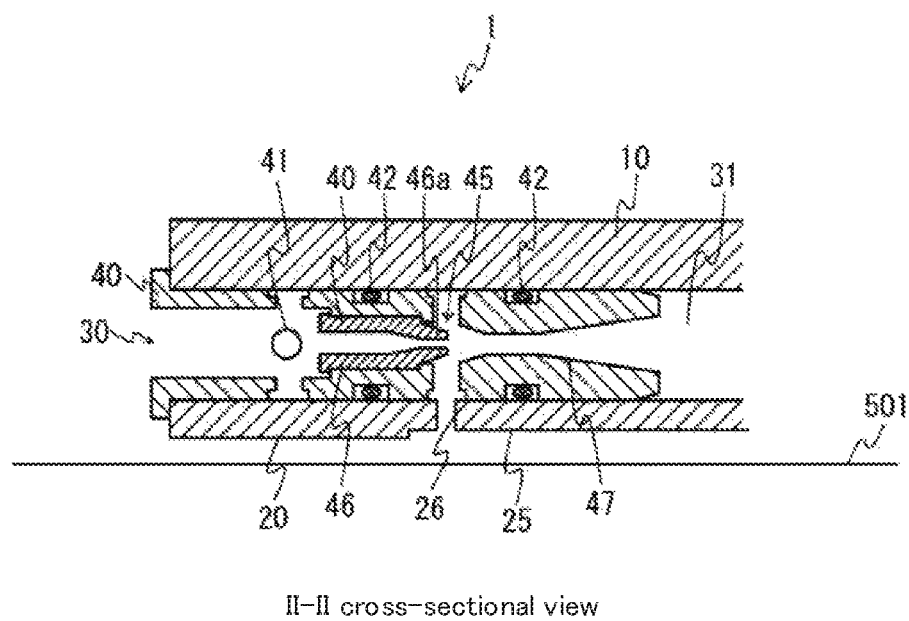
FIG. 6 shows a II-II cross-sectional view of FIG. 4.

An internal configuration of the air bearing 1 is explained with reference to FIGS. 4 to 6. FIG. 4 shows the internal configuration of the air bearing 1. FIG. 5 shows a I-I cross-sectional view of FIG. 4. FIG. 6 shows a II-II cross-sectional view of FIG. 4.

As shown in FIG. 4, the air bearing 1 includes an inflow port 30, flow path parts 31, 32, 33, a branch part 34, an exhaust port 35, a vacuum ejector 40, a negative pressure generating part 45, and a restricting part 50. It should be noted that in the present embodiment, the flow path part 32 and the flow path part 33 correspond to the first flow path part, and the flow path part 31 corresponds to the second flow path part.

The inflow port 30 is an opening into which the compressed air supplied from the supply path 510 (FIG. 1) flows. The inflow port 30 is located at one end side of the flow path part 31. Further, although not shown in FIG. 4, the inflow port 30 is connected to the supply path 510.

The flow path parts 31, 32, and 33 are provided in the main body part 10, and are flow paths through which compressed air from the inflow port 30 flows. The flow path part 31 and the flow path part 33 are provided along the X-axis direction of FIG. 4, and the flow path part 32 is provided along the Y-axis direction of FIG. 4 so as to be orthogonal to the flow path parts 31 and 33. The flow path parts 32 and 33 have the above-described air supply holes 21, and the flow path part 31 has the above-described suction hole 26. It should be noted that plugs 60 that close the openings are provided in the openings of the end parts of the flow path part 32 and the flow path part 33.

The branch part 34 is provided in the middle of the flow path part 31 and is a part for directing a portion of the compressed air flowing from the inflow port 30 toward the flow path part 32. The compressed air that reaches the branch part 34 from the inflow port 30 is branched in three directions in the branch part 34. The compressed air that diverts from the branch part 34 to the flow path part 32 flows through the flow path part 32 and the flow path part 33. On this occasion, the compressed air is supplied from the air supply hole 21 toward the guide face 501.

The exhaust port 35 is an opening provided on the opposite side of the inflow port 30 in the flow path part 31. The compressed air flowing through the flow path part 31 is expelled from the exhaust port 35 to the atmosphere. Further, the suction air (the air in the recessed part 25) sucked by the negative pressure (about −80 (kPa)) generated by the negative pressure generating section 45 is also expelled to the atmosphere from the exhaust port 35.

The vacuum ejector 40 has a function of generating negative pressure by using compressed air. The vacuum ejector 40 is a metal or resin mounting member that is detachably mounted on the inflow port 30 side of the flow path part 31. For example, the vacuum ejector 40 includes a screw part that can be fastened to the flow path part 31. The vacuum ejector 40 has a cylindrical shape, and compressed air passes through it. Between the outer circumferential surface of the vacuum ejector 40 and the inner wall of the flow path part 31, an O ring 42 is provided as a seal member.

The vacuum ejector 40 has an opening 41 at a position corresponding to the branch part 34, and so compressed air can be diverted to the flow path part 32. Further, as shown in FIG. 4, the vacuum ejector 40 has a negative pressure generating part 45 and a diffuser part 47.

The negative pressure generating part 45 increases the flow velocity of the compressed air passing through the inside of the vacuum ejector 40 and generates a negative pressure for sucking the air in the recessed part 25. By generating such a negative pressure, it becomes possible to preload the air film, and stiffness of the air film can be enhanced. It should be noted that the preload amount is the product of the negative pressure generated by the negative pressure generating part and the area of the recessed part 25. Here, since the suction force is about 0.8 (kgf/cm²), when the area of the recessed part 25 is, for example, 50 (cm²), the suction force is about 40 (kgf).

The negative pressure generating part 45 has a replaceable nozzle part 46. The nozzle part 46 narrows the flow path of the flow path part 31 to increase the flow velocity of the compressed air. The tip side of the nozzle part 46 is formed in a conical shape, and the flow velocity of the compressed air is increased at the nozzle tip. Specifically, in accordance with the diameter of the opening 46a at the tip of the nozzle part 46 (for example, the diameter is in the range of 0.5 (mm) to 1.0 (mm)), the flow velocity of the compressed air becomes larger. When the flow velocity of the compressed air at the nozzle tip increases, the pressure around the nozzle tip decreases and a negative pressure is generated.

In the present exemplary embodiment, since the tip of the nozzle part 46 is located right above the suction hole 26, a negative pressure is generated around the suction hole 26. The negative pressure is generated in a direction orthogonal to the flow of compressed air in accordance with the Bernoulli's principle of negative pressure generation. Here, a negative pressure is generated in the direction from the suction hole 26 to the tip of the nozzle part 46 located above. By generating such a negative pressure, the air in the recessed part 25 passes through the suction hole 26 and flows into the flow path part 31. It should be noted that the air flowing into the flow path part 31 is expelled to the atmosphere through the exhaust port 35 together with the compressed air.

The diffuser part 47 is a part that increases the pressure by reducing the flow velocity of the air flowing in from the suction hole 26.

The restricting part 50 is a part narrowing the flow path of the flow path part 32. The restricting part 50 is located between the branch part 34 and the air supply hole 21 in the flow path part 32. By providing the restricting part 50 on the upstream side of the air supply hole 21, it is possible to suppress the excessive flow rate of the compressed air flowing toward the air supply hole 21 (two-step restricting method). Here, the flow rate of the compressed air is adjusted in accordance with the diameter do of an opening 50a at the tip of the restricting part 50. For example, when there are two air supply holes 21 having a diameter $d_1=0.2$ (mm), the diameter can be generally calculated by $d_0 \leq (n)^{1/2} \times d_1$, and so $d_0 \leq (2)_{1/2} \times 0.2 \approx 0.28$. Therefore, the size of the diameter do is suitably 0.28 (mm) or less. As a result, the flow rate of the compressed air supplied from the air supply hole 21 is reduced, and it is possible to suppress the increase in the film thickness of the air film, and so it is possible to suppress the reduction in the stiffness of the air film.

Further, there is a possibility of generating a pneumatic hammer that is unstable vibration in general air bearings, but in the present exemplary embodiment, by providing the restricting part 50, the pneumatic hammer of the air bearing 1 can be effectively suppressed by the air chamber 55 that is provided between the restricting part 50 and the air supply hole 21.

The air chamber 55 is a part located at a position where the flow path of the flow path part 32 is expanded, and is formed to intersect with the flow path part 33. Here, the air chamber 55 and the flow path part 33 are located on the upstream side of the two air supply holes 21. Therefore, the air chamber 55 and the flow path part 33 can supply uniform air pressure (back pressure) to the two air supply holes 21. As a result, the flow rate of the air supplied from each air supply hole 21 is equalized, and so the film thickness of the air film becomes uniform and the lowering of the stiffness of the air film can effectively be suppressed.

In the case where the air between the guide face 501 and the main body part 10 is sucked by the negative pressure generating part 45, there is a possibility that dust, dirt, or the like adhering to the guide face 501 enters the vacuum ejector 40. In such a case, the diffuser part 47 or the like of the vacuum ejector 40 may be clogged with the dust, dirt, or the like. On the other hand, in the present exemplary embodiment, the vacuum ejector 40 is detachably attached to the main body part 10 as described above, and so the vacuum ejector 40 that is clogged with dust, dirt, or the like can be removed to be cleaned or replaced if it breaks down.

<Flow of Compressed Air in the Air Bearing 1>

Figure 7:
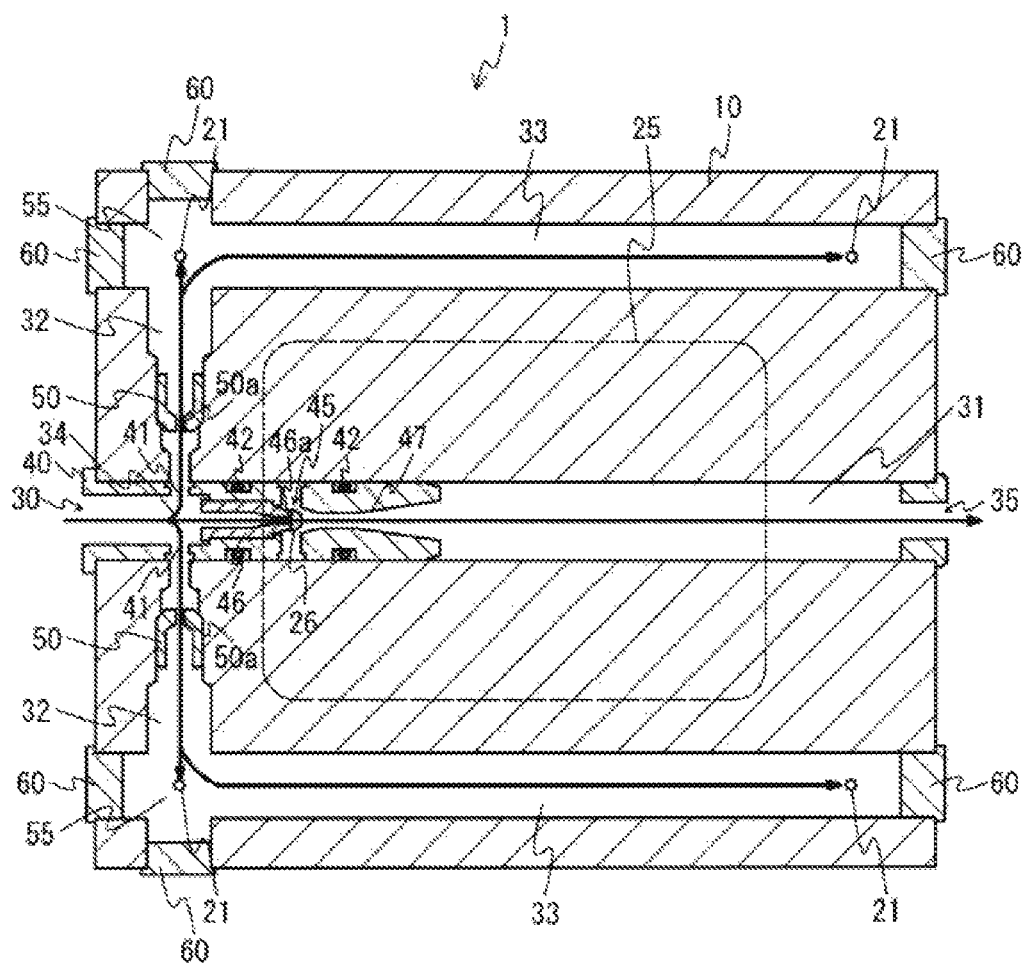
FIG. 7 shows a diagram for explaining a flow of compressed air in the air bearing 1.
Figure 8:
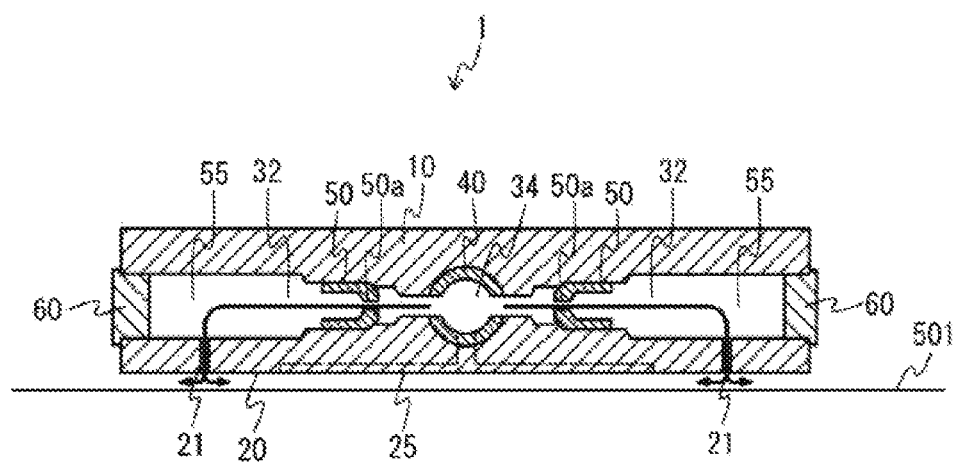
FIG. 8 shows a diagram for explaining the flow of compressed air in the air bearing 1.
Figure 9:
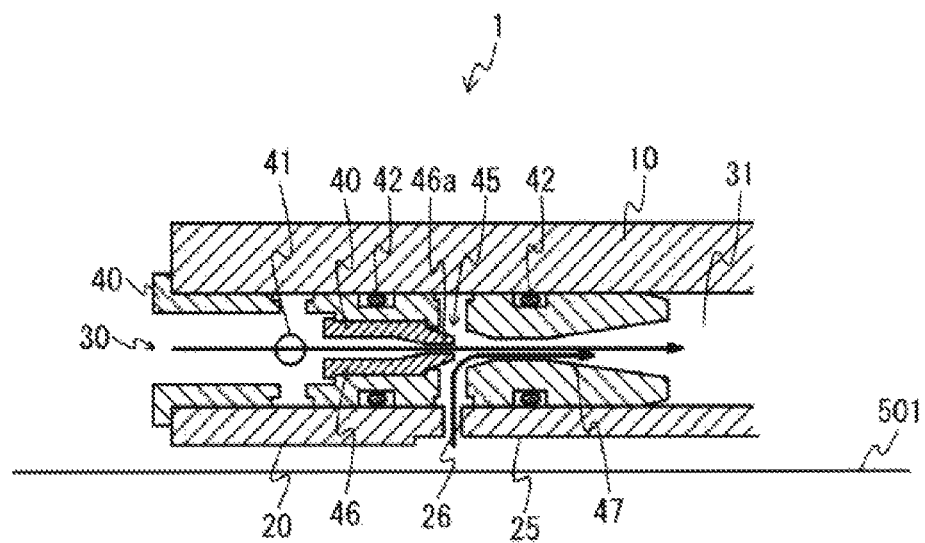
FIG. 9 shows a diagram for explaining the flow of compressed air in the air bearing 1.

The flow of compressed air in the air bearing 1 having the above-described configuration is explained with reference to FIGS. 7 to 9. FIGS. 7 to 9 show diagrams for explaining the flow of compressed air in the air bearing 1. In FIGS. 7 to 9, the flow of air is indicated by bold lines.

The compressed air supplied via the supply path 510 (FIG. 1) flows into the flow path part 31 from the inflow port 30. The compressed air flows through the flow path part 31, and if there is a sufficient air flow rate from the compressor, the compressed air is divided into three directions at the branch part 34 without reducing the air pressure as shown in FIG. 7. That is, a portion of the compressed air flows from the branch part 34 to the left and right flow path parts 32, and the rest of the compressed air flows straight in the branch part 34 toward the negative pressure generating part 45.

The compressed air flowing from the branch part 34 to the flow path part 32 flows toward the air chamber 55 and the flow path part 33 after the flow rate is controlled by the restricting part 50. At this time, compressed air is supplied from the air supply hole 21 toward the guide face 501 as shown in FIG. 8, and so an air film is formed between the bearing surface 20 and the guide face 501.

On the other hand, the flow velocity of the compressed air advancing straight from the branch part 34 to the negative pressure generating part 45 increases at the tip of the nozzle part 46. As the flow velocity of the compressed air increases, the pressure around the suction hole 26 in the negative pressure generating part 45 decreases, and a negative pressure is generated. Then, the air in the recessed part 25 flows into the flow path part 31 via the suction hole 26 due to the negative pressure as shown in FIG. 9 and is expelled to the atmosphere from the exhaust port 35 together with the compressed air.

Modification Examples

Modification examples of the air bearing 1 will be explained with reference to FIGS. 10 to 14.

Figure 10:
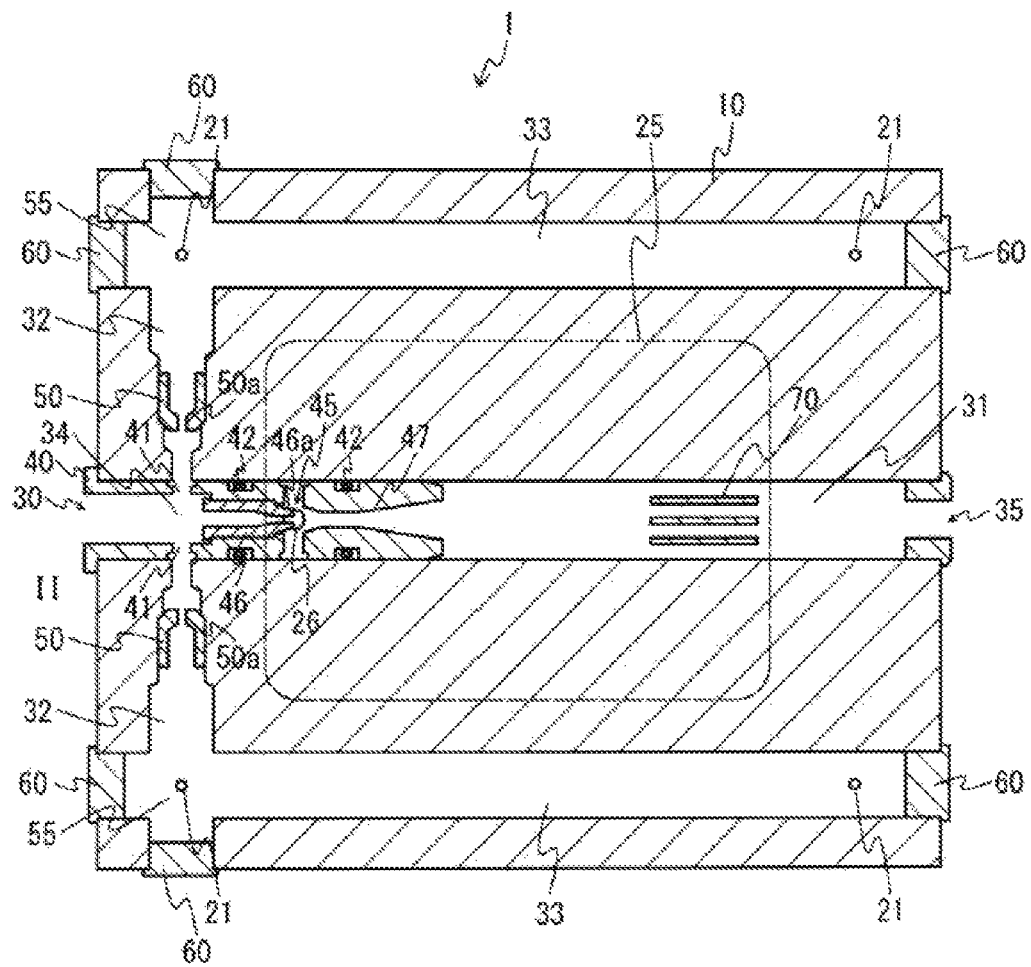
FIG. 10 shows a first modification example of the air bearing 1.

FIG. 10 shows a first modification example of the air bearing 1. In the first modification example, a flow straightening part 70 is provided between the vacuum ejector 40 (specifically, the negative pressure generating part 45) and the exhaust port 35 in the flow path part 31. The flow straightening part 70 has a function of straightening the flow of the compressed air that has passed through the negative pressure generating part 45 and the air sucked by the negative pressure (also referred to as suction air).

The flow straightening part 70 includes a plurality of protrusions formed in a streak shape along, for example, the longitudinal direction of the flow path part 31. In such a case, when the compressed air or the suction air passes through the streak-shaped protrusion, the direction of flow is adjusted by the protrusion. As a result, the flow straightening part 70 has the function of a silencer, and a silencing effect can be obtained. In addition, the flow straightening part 70 may include, for example, a filter for passing compressed air or suction air, instead of the protrusion. For example, cotton may be used as the filter. Even in such a case, a silencing effect can be obtained.

Figure 11:
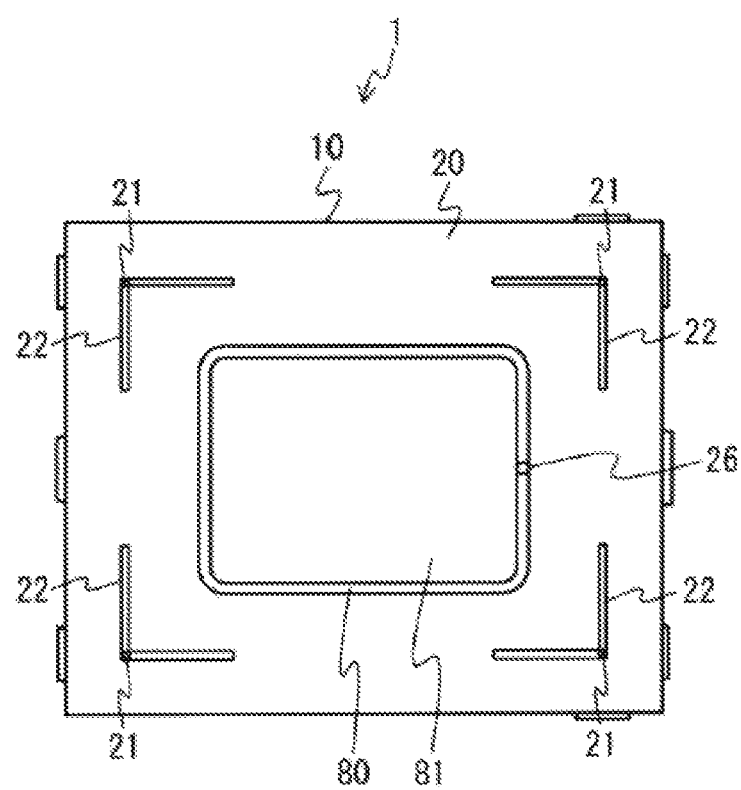
FIG. 11 shows a second modification example of the air bearing 1.

FIG. 11 shows a second modification example of the air bearing 1. In the exemplary embodiment described above, the recessed part 25 (FIG. 6) is formed in the bearing surface 20 of the main body part 10, and the air in the recessed part 25 is sucked by the negative pressure generated in the negative pressure generating part 45. In contrast, in the second modification example, an annular groove 80 is provided in the bearing surface 20 of the main body part 10 as shown in FIG. 11 instead of the recessed part 25.

The annular groove 80 communicates with the suction hole 26. Therefore, the air in the annular groove 80 flows to the flow path part 31 via the suction hole 26 due to the negative pressure generated in the negative pressure generating part 45. Further, a surface 81 surrounded by the annular groove 80 is flush with the bearing surface 20. As a result, all regions of the inner side surrounded by the annular groove 80 become suction areas with the same atmospheric pressure. In the case of the annular groove 80, the amount of processing is smaller than that of the rectangular recessed part 25, and so it is easy to manufacture the main body part 10.

Figure 12:
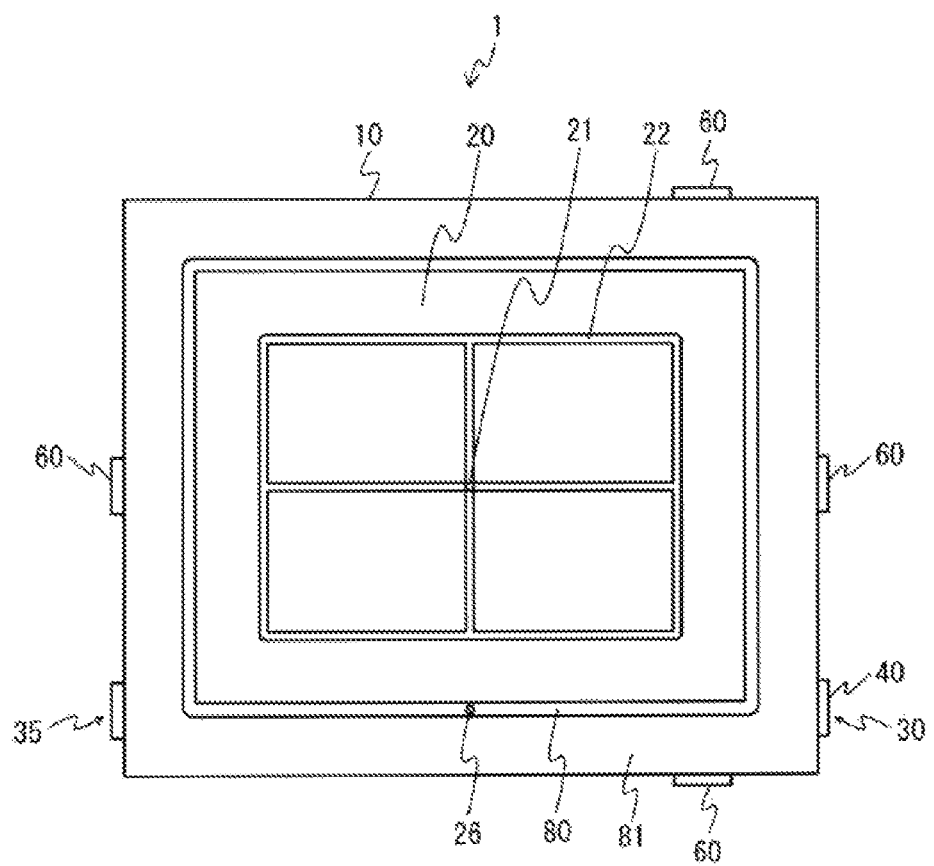
FIG. 12 shows a third modification example of the air bearing 1.

FIG. 12 shows a third modification example of the air bearing 1. In the third modification example, the suction hole 26 communicates with the annular groove 80 which is wider than that of the second modification example. Further, a groove part 22 in 'a cross inside a square' shape is provided inside the annular groove 80. Here, one air supply hole 21 is provided at the center of the bearing surface 20 of the main body part 10, but it is not so limited, and a plurality of air supply holes 21 may be provided in, for example, the groove part 22. As a result, an air film is formed all around the inside of the groove part 22 and around the outside of the groove part 22, and the air bearing 1 is made to float. Furthermore, the bearing surface 20 is located between the annular groove 80 and the groove part 22, and is flush with the surface 81 that is on an outer side of the annular groove 80. Even in such a configuration, the air in the annular groove 80 flows to the flow path part 31 via the suction hole 26 due to the negative pressure generated in the negative pressure generating part 45. As a result, a suction force due to a negative pressure is generated on the surface 81 that is on an outer side of the annular groove 80. The annular groove 80 sucks the air of the air film around the groove part 22. According to the third modification example, it is possible to configure the air bearing 1 such that the inside (air supply region) of the bearing surface 20 of the air bearing 1 floats while the outside (suction region) is sucked. In such a case, it is possible to recover the air supplied from the air supply hole 21 from the suction hole 26. As a result, air is not expelled to the surroundings of the air bearing 1, and so the air bearing 1 is suitable for use in a semiconductor manufacturing apparatus or the like which is required to have a uniform temperature environment or a very clean environment.

Figure 13:
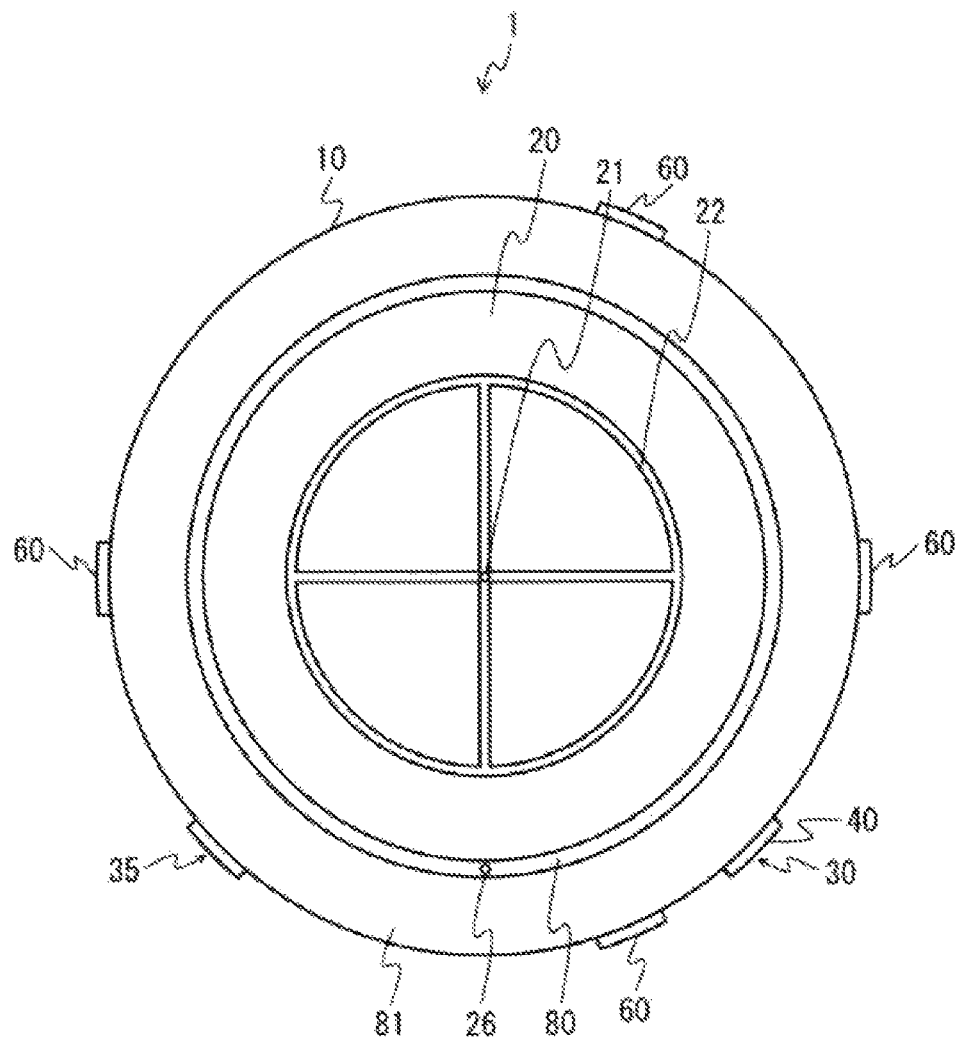
FIG. 13 shows a fourth modification example of the air bearing 1.

FIG. 13 shows a fourth modification example of the air bearing 1. The fourth modification example is an example in which the main body part 10 of the third modification example is formed in a circular shape. Accordingly, the annular groove 80 and the groove part 22 are also formed in a shape that matches the circular main body part 10. Even in such a configuration, the air in the annular groove 80 flows to the flow path part 31 via the suction hole 26 due to the negative pressure generated in the negative pressure generating part 45. Therefore, the operational effect exhibited by the fourth modification example is almost the same as the operational effect exhibited by the third modification example.

Figure 14:
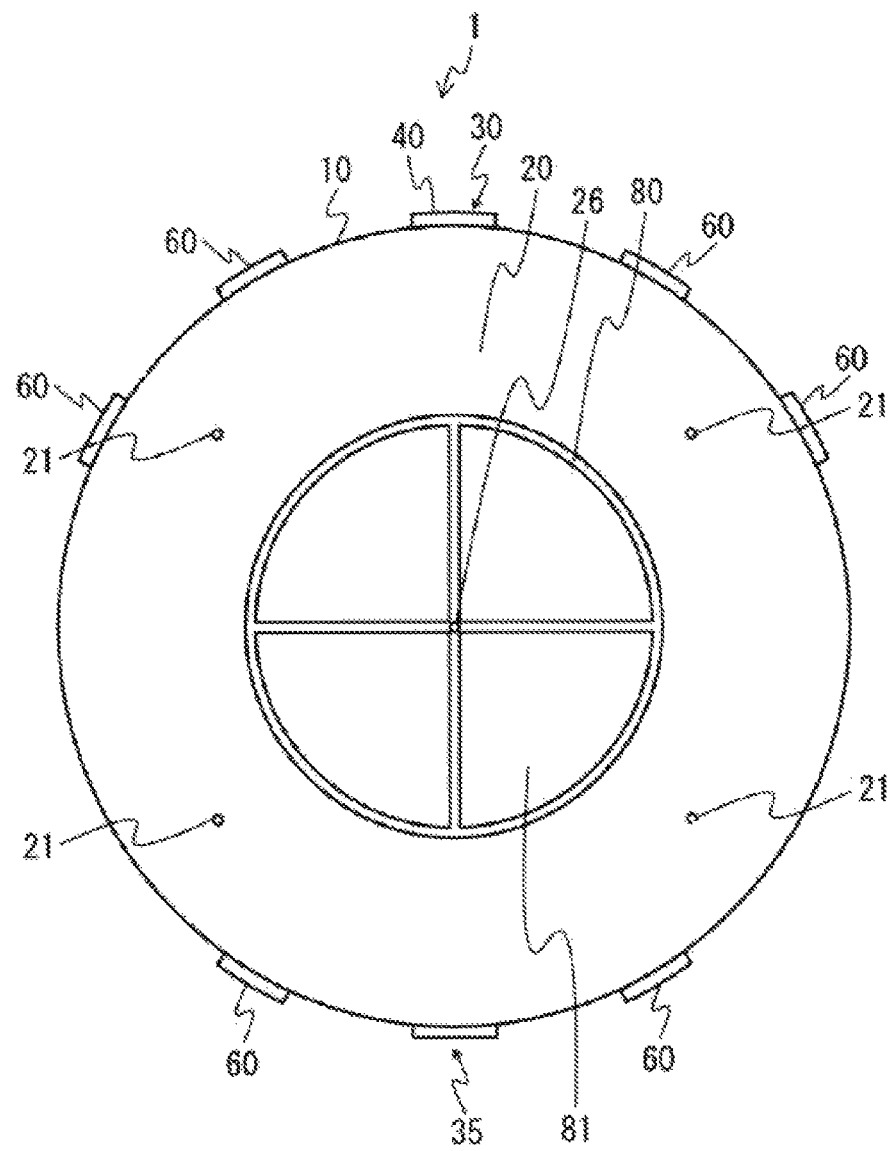
FIG. 14 shows a fifth modification example of the air bearing 1.

FIG. 14 shows a fifth modification example of the air bearing 1. In the fifth modification example, the main body part 10 has a circular shape, as in the fourth modification example. On the other hand, in the fifth modification example, the suction hole 26 is positioned at the center of the bearing surface 20 of the main body part 10 and communicates with the annular groove 80. Even in such a configuration, the air in the annular groove 80 flows to the flow path part 31 via the suction hole 26 due to the negative pressure generated in the negative pressure generating part 45. It should be noted that the suction hole 26 does not need to be located at the center of the bearing surface 20 and may be located anywhere in the annular groove 80. Even in such a case, all of the inside (suction region) of the annular groove 80 has a substantially uniform negative pressure and generates suction force.

In addition, around the annular groove 80, for example, four air supply holes 21 are provided symmetrically in consideration of balance. These four air supply holes 21 are provided at predetermined intervals in the circumferential direction around the annular groove 80. As a result, an air film is formed on the outside (air supply region) of the annular groove 80, and the air bearing 1 floats. Therefore, the air bearing 1 floats from the guide face 501 via the air film, and the vacuum preload acts due to the suction force generated inside the annular groove 80. Accordingly, as long as the air bearing 1 is not pulled with a force greater than the suction force, the air bearing 1 does not leave the guide face 501. According to the fifth modification example, air is supplied from the air supply holes 21 arranged around the annular groove 80 to float the air bearing 1, and so dust in the vicinity of the air bearing 1 is blown off and it is possible to prevent dust from being sucked by the suction holes 26 arranged inside of the annular groove 80. It should be noted that even if the annular groove 80 and the inside of the annular groove 80 are changed to recessed parts, the same effect can be obtained.

Effect of the Present Exemplary Embodiment

The air bearing 1 according to the exemplary embodiment described above includes the negative pressure generating part 45 inside the main body part 10. The negative pressure generating part 45 is provided in a flow path part 31 that intersects with the flow path part 32 having the air supply hole 21 and increases the flow velocity of the compressed air, and so a negative pressure for sucking air (for example, the air in the recessed part 25) between the guide face 501 and the main body part 10 is generated. That is, since the vacuum preloading function can be realized merely by supplying compressed air in the same manner as the conventional air bearing, it is easy to replace with the conventional air bearing (it has compatibility in use) and the stiffness of the air bearing can be increased by the replacement. Further, since there is no need for a device for preloading other than the air bearing itself like a preload device using a spring or the like, an air bearing having a preload function that is capable of reducing the size and cost of the device can be realized.

Furthermore, in the present exemplary embodiment, when the air film is formed with the compressed air supplied to the main body part 10, the negative pressure generating part 45 can preload the air film by utilizing the compressed air to generate a negative pressure. That is, the air bearing 1 generates a negative pressure without using a vacuum pump. This eliminates the need for a vacuum pump, piping, and the like for generating a negative pressure, and so a vacuum preloading function can be realized with a simple configuration.

It should be noted that it was assumed that the air bearing 1 is attached to the measuring equipment in the above description, but it is not so limited. For example, the air bearing 1 may be attached to a semiconductor manufacturing apparatus or a machine tool.

Moreover, as described above, the main body part 10 of the air bearing 1 is not limited to a rectangular parallelepiped shape, and may be a cylindrical shape, a triangular prism shape, an elliptic cylinder shape, or other shapes as in the fourth modification example and the fifth modification example. Further, the compressed air is diverted to the left and right flow path parts 32 at the branch part 34 in the above description, but it is not so limited. For example, the compressed air may be diverted to one flow path part 32 at the branch part 34.

Further, in the above description, the air bearing 1 is used while floating from the guide face 501, but it is not so limited. For example, as in the sixth modification example shown in FIG. 15, the air bearing 1 may have a configuration in which the air bearing 1 is switched between a floating state where an air film is formed and the air bearing 1 floats from the guide face 501 (in a state where vacuum preload is applied) and a suction state where the air film is not formed and the air bearing 1 is sucked to the guide face 501 (clamped state). It should be noted that the use of the air bearing 1 in a suction state is advantageous in that, for example, the guiding mechanism of the measuring equipment to which the air bearing 1 is attached can perform a high-precision measurement while being held at a predetermined position.

Figure 15A:
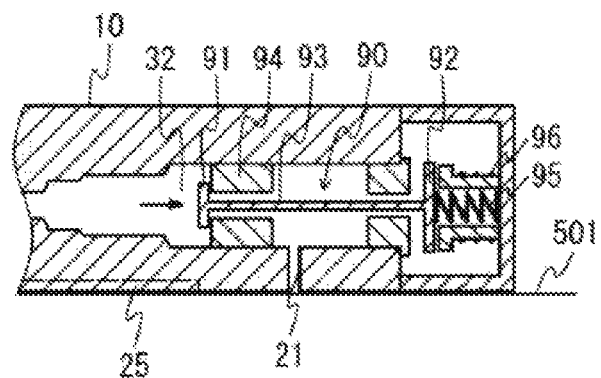
FIG. 15A shows a sixth modification example of the air bearing 1.
Figure 15B:
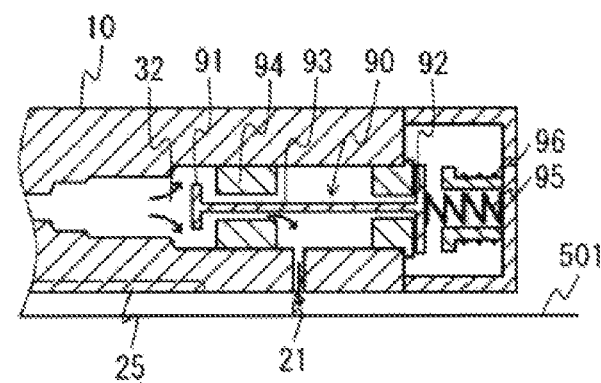
FIG. 15B shows a sixth modification example of the air bearing 1.

FIG. 15 shows a sixth modification example of the air bearing 1. FIG. 15 (*a*) shows the air bearing 1 in the suction state, and FIG. 15 (*b*) shows the air bearing 1 in the floating state. In the sixth modification example, an opening-closing valve 90, a compression spring 95, and an electromagnetic coil 96 are provided in the flow path part 32 (specifically, the part where the plug 60 is provided in FIG. 4).

The opening-closing valve 90 is movably provided in the flow path part 32. The opening-closing valve 90 controls the opening and closing of an opening of a valve seat 94 provided in the flow path part 32. The opening-closing valve 90 has a valve body 91 and a pressed part 92.

The valve body 91 is connected to the pressed part 92 by a connecting shaft 93, and the valve body 91 and the pressed part 92 can move together. The valve body 91 moves between a closed position (FIG. 15 (*a*)) where the opening of the valve seat 94 (inflow port of compressed air) is closed and an open position (FIG. 15 (*b*)) where the opening of the valve seat 94 is opened. The valve seat 94 is located closer to the branch part 34 (FIG. 4) side than the air supply hole 21 in the flow path part 32, and the compressed air can pass through the opening (through-hole) of the valve seat 94 when the valve seat 94 is opened.

The pressed part 92 is pressed by a compression spring 95 that is arranged outside the opening-closing valve 90. As the pressed part 92 is pressed by the compression spring 95, the valve body 91 is positioned at the open position as shown in FIG. 15 (*b*).

The compression spring 95 is a biasing member that biases the pressed part 92 of the opening-closing valve 90 from the closed position toward the open position. Therefore, the opening-closing valve 90 is usually located at the open position shown in FIG. 15 (*b*).

The electromagnetic coil 96 is arranged such that it covers the compression spring 95. The electromagnetic coil 96 generates a suction force when being energized. Due to this suction force, the pressed part 92 moves from the open position to the closed position, opposing the pressing force of the compression spring 95. As a result, when the electromagnetic coil 96 is energized, the opening-closing valve 90 is positioned at the closed position shown in FIG. 15 (*a*). On the other hand, when the energization to the electromagnetic coil 96 is turned off, the opening-closing valve 90 is positioned at the open position due to the compression spring 95. It should be noted that energization to the electromagnetic coil 96 is managed by an external control device.

In the sixth modification example described above, the opening-closing valve 90 is positioned at the closed position or the open position by switching the energization to the electromagnetic coil 96 ON and OFF. Then, when the opening-closing valve 90 is located at the open position, the compressed air that has passed through the opening of the valve seat 94 is supplied to the guide face 501 through the air supply hole 21. As a result, an air film is formed between the bearing surface 20 and the guide face 501, and the floating state, in which the air bearing 1 is floated, is obtained.

When the opening-closing valve 90 is located at the closed position, compressed air does not flow through the opening of the valve seat 94, and so the compressed air is not supplied to the guide face 501. On the other hand, as described above, the air in the recessed part 25 is sucked by the negative pressure generating part 45 of the vacuum ejector 40, and so the air bearing 1 is brought into a suction state where the air bearing 1 is sucked to the guide face 501 by the suction force.

The present invention is explained with the exemplary embodiments of the present invention but the technical scope of the present invention is not limited to the scope described in the above embodiment. It is apparent for those skilled in the art that it is possible to make various changes and modifications to the embodiment. It is apparent from the description of the scope of the claims that the forms added with such changes and modifications are included in the technical scope of the present invention.

What is claimed is:

1. An air bearing, comprising:
a main body part that includes a bearing part opposed to a guide face;
two first flow path parts and a second flow path part to which compressed air supplied from outside flows after being branched by a branch part, the first flow path parts and the second flow path part being provided in the main body part;
an air supply hole for supplying compressed air to the guide face to form an air film between the bearing surface and the guide face, the air supply hole being provided in the first flow path parts; and
a negative pressure generating part for generating a negative pressure for sucking air between the guide face and the main body part by increasing flow velocity of the compressed air, the negative pressure generating part being provided in the second flow path part, wherein
the first flow path parts are provided so as to be branched from the branch part in directions symmetrical to each other.

2. The air bearing according to claim 1, wherein the bearing surface has a suction region communicating with the negative pressure generating part and generating a vacuum preload.

3. The air bearing, according to claim 2, wherein the suction region is a recessed part region formed in the bearing surface of the main body part.

4. The air bearing according to claim 2, wherein the suction region is a region surrounded by an annular groove that is flush with the bearing surface of the main body part.

5. The air bearing according to claim 1, wherein the negative pressure generating part includes a nozzle part for narrowing the flow path of the second flow path part to increase the flow velocity of the compressed air, and
the second flow path part includes a suction hole for sucking air between the guide face and the main body part using a negative pressure generated on a tip side of the nozzle part.

6. The air bearing according to claim 5, wherein the nozzle part is detachably mounted.

7. The air bearing according to claim 5, wherein a tip of the nozzle part is located right above the suction hole, and
the negative pressure generating part generates the negative pressure around the suction hole.

8. The air bearing according to claim 5, wherein the suction hole is connected to an annular groove formed on the same surface as the bearing surface of the main body part.

9. The air bearing according to claim 5, wherein the suction hole sucks air in a suction region on the center region of the bearing surface, and
the air supply hole supplies compressed air to an air supply region outside the suction region.

10. The air bearing according to claim 5, wherein the air supply hole supplies compressed air to an air supply region on the center region of the bearing surface, and
the suction hole sucks air in a suction region outside the air supply region.

11. The air bearing according to claim 1, wherein a restricting part that narrows a flow path of the first flow path parts is provided between the branch part and the air supply hole.

12. The air bearing according to claim 11, wherein an air chamber that is an expanded flow path is provided between the restricting part and the air supply hole.

13. The air bearing according to claim 1, wherein the second flow path part includes a flow straightening part for straightening air flow.

14. The air bearing according to claim 13, wherein the flow straightening part includes a plurality of protrusions along a longitudinal direction of the second flow path part.

15. The air bearing according to claim 1, further comprising:
an opening-closing valve that is movably provided in the first flow path parts and opens and closes an opening through which compressed air supplied to the air supply hole passes;
a biasing member that presses the opening-closing valve to open the opening; and
an electromagnetic coil that opposes the bias force of the biasing member to attract the opening-closing valve and closes the opening when being energized, wherein
when the negative pressure generating part generates the negative pressure in a state where the opening-closing valve closes the opening, the main body part is sucked to the guide face due to a suction force.

16. The air bearing according to claim 15, wherein the opening-closing valve includes:
a valve body that can open and close the opening; and
a pressed part that is connected to the valve body by a connecting shaft and is pressed by the biasing member.

17. The air bearing according to claim 1, wherein the first flow path parts and the second flow path part are positioned at the same position in a thickness direction of the main body part.

18. The air bearing according to claim 1, wherein each of the two first flow path parts comprises a vertical flow path and a horizontal flow path being orthogonal to the vertical flow path, the vertical flow path extending from the branch part and connected to the horizontal flow path,
- the second flow path part has a center line extending in a direction parallel to a direction in which the horizontal flow path extends, and
- the vertical flow path and the horizontal flow path of one of the two first flow path parts are symmetrical to the vertical flow path and the horizontal flow path of another one of the two first flow path parts with respect to the center line of the second flow path part.

19. An air bearing, comprising:
- a main body part that includes a bearing part opposed to a guide face;
- a first flow path part and a second flow path part to which compressed air supplied from outside flows after being branched by a branch part, the first flow path part being provided in the main body part;
- an air supply hole for supplying compressed air to the guide face to form an air film between the bearing surface and the guide face, the air supply hole being provided in the first flow path part;
- a negative pressure generating part for generating a negative pressure for sucking air between the guide face and the main body part by increasing flow velocity of the compressed air, the negative pressure generating part being provided in the second flow path part;
- an opening-closing valve that is movably provided in the first flow path part and opens and closes an opening through which compressed air supplied to the air supply hole passes;
- a biasing member that presses the opening-closing valve to open the opening; and
- an electromagnetic coil that opposes the bias force of the biasing member to attract the opening-closing valve and closes the opening when being energized, wherein
- when the negative pressure generating part generates the negative pressure in a state where the opening-closing valve closes the opening, the main body part is sucked to the guide face due to a suction force.

20. The air bearing according to claim 19, wherein the opening-closing valve includes:
- a valve body that can open and close the opening; and
- a pressed part that is connected to the valve body by a connecting shaft and is pressed by the biasing member.

* * * * *